United States Patent [19]

Edlund et al.

[11] Patent Number: 5,167,906

[45] Date of Patent: Dec. 1, 1992

[54] APPARATUS FOR INCREASING FUEL EFFICIENCY IN NUCLEAR REACTORS

[75] Inventors: Milton C. Edlund; Robert W. Hendricks, both of Montgomery County, Va.; Robert E. Swanson, Cambria County, Pa.

[73] Assignee: Energy Control and Development Co., Blacksburg, Va.

[21] Appl. No.: 796,584

[22] Filed: Nov. 22, 1991

Related U.S. Application Data

[63] Continuation-in-part of Ser. No. 590,696, Oct. 1, 1990, Pat. No. 5,075,069.

[51] Int. Cl.$^5$ .............................................. G21C 7/26
[52] U.S. Cl. .................................. 376/209; 376/221; 376/327; 376/336
[58] Field of Search ............... 376/209, 221, 327, 336, 376/328

[56] References Cited

U.S. PATENT DOCUMENTS

| | | | |
|---|---|---|---|
| Re. 33,030 | 8/1989 | Marlatt | 376/209 |
| 3,081,246 | 3/1963 | Edlund | 376/209 |
| 4,657,726 | 4/1987 | Lancaster | 376/209 |
| 4,664,878 | 5/1987 | Wilson | 376/328 |
| 4,683,103 | 7/1987 | Lott | 376/209 |
| 4,683,116 | 7/1987 | Ferrari | 376/447 |
| 4,687,620 | 8/1987 | Impink, Jr. | 376/209 |
| 4,687,621 | 8/1987 | Ferrari | 376/209 |
| 4,687,627 | 8/1987 | Wilson et al. | 376/333 |
| 4,707,331 | 11/1987 | Sherwood | 376/463 |
| 4,708,842 | 11/1987 | Veronesi | 376/203 |
| 4,710,340 | 12/1987 | Dollard et al. | 376/209 |
| 4,716,006 | 12/1987 | Impink, Jr. | 376/209 |
| 4,716,007 | 12/1987 | Carlson et al. | 376/209 |
| 4,717,527 | 1/1988 | Gjertsen | 376/209 |
| 4,735,767 | 4/1988 | Mallener et al. | 376/337 |
| 5,075,069 | 12/1991 | Edlund | 376/209 |

Primary Examiner—Brooks H. Hunt
Assistant Examiner—Frederick H. Voss
Attorney, Agent, or Firm—Pitts and Brittian

[57] ABSTRACT

An apparatus for achieving increased fuel efficiency in a nuclear reactor wherein spectral shift is utilized to adjust for excess reactivity. This feature is achieved by stationary displacer rods within the fluid moderator of the reactor, with these stationary displacer rods decreasing ineffective volume during operation of the reactor whereby the effective volume of the fluid moderator increases as the nuclear fuel is burned. This decrease in effective volume is achieved by providing a sacrificial material in the displacer rods that is dissolved (or volatilized, etc.) by the fluid moderator. The composition of the sacrificial material can be varied along the length of the rod so as to achieve the desired reduction of volume despite a temperature gradient along the rod.

20 Claims, 4 Drawing Sheets

APPARATUS FOR INCREASING FUEL EFFICIENCY IN NUCLEAR REACTORS

This is a Continuation-in-Part patent application based upon parent application Ser. No. 07/590,696 filed on Oct. 1, 1990 and now U.S. Pat. No. 5,075,069.

DESCRIPTION

1. Technical Field

The present invention relates generally to nuclear reactors, and more particularly to a type of nuclear reactor known as a "spectral shift" reactor whereby excess reactivity is provided initially, with some means of regulating the level of the reactor during reactor operation lifetime. More specifically, the present invention provides a means for increasing fuel efficiency by automatically changing the relative fuel-to-moderator volumes during the reactor operation.

2. Background Art

In every nuclear reactor there must be arranged a quantity of fissionable material as a fuel and other materials as a moderator such that a "chain" reaction is achieved. The mass of fissionable material is termed a "critical mass". In order that the nuclear reactor can be operated over an appreciable period of time there must be included an excess of fuel above the critical mass, with this excess representing the fuel that will be consumed during operation of the reactor. As this extra fuel makes available a quantity of neutrons greater than the quantity necessary to perpetuate a controlled chain reaction, these excess neutrons must be absorbed in some manner so that an uncontrolled reaction does not result. The inherent ability of the excess fuel to produce these excess neutrons is generally referred to as "excess reactivity".

In the field of liquid (usually water) moderated nuclear reactors, such as pressurized water reactors (PWR), one technique for the control of reactivity is to produce an initial "spectral shift" which has the effect of increasing the epithermal (low reactivity) part of the neutron spectrum at the expense of the thermal (high reactivity) part. This results in production of fewer thermal neutrons and decreased fission. Then, as fission decreases during extended reactor operation, a reverse shift back to the thermal part of the neutron spectrum is undertaken.

There have been numerous systems developed to achieve this spectral shift. One such system is described in U.S. Pat. No. 3,081,246 issued to M. C. Edlund on Mar. 12, 1963. This system utilized the control of the ratio of heavy and light water used as moderator (and coolant) in the reactor during operation. More recently various mechanical systems have been developed to effect the volumetric ratio between the fuel and the moderator to achieve the spectral shift concept. Typical of these systems are described in U.S. Pat. Nos.: 4,657,726 issued to D. B. Lancaster, et al., on Apr. 14, 1987; U.S. Pat. No. 5,683,103 issued to R. G. Lott, et al., on Jul 28, 1987; U.S. Pat. No. 4,683,116 issued to H. M. Ferrari, et al., on Jul. 28, 1987; U.S. Pat. No. 4,687,620 issued to A. J. Impink, Jr., on Aug. 18, 1987; U.S. Pat. No. 4,687,621 issued to H. M. Ferrari on Aug. 19, 1987; U.S. Pat. No. 4,687,627 issued to J. F. Wilson, et al., on Aug. 18, 1987; U.S. Pat. No. 4,710,340 issued to W. J. Dollard, et al., on Dec. 1, 1987; and U.S. Pat. No. 4,716,007 issued to W. R. Carlson, et al., on Dec. 29, 1987.

In all but the '621 of the "mechanical regulation" patents, there are a plurality of "displacer rods" that can be moved within the reactor. Initially these displacer rods are fully inserted so as to displace a portion of the water within the reactor. As reactor operation proceeds, these rods are removed so as to add a higher proportion of water and thus more moderation as the fuel is consumed to achieve the spectral shift. Generally these displacer rods are grouped for a single fuel element, or a group of elements, so that a single mechanism can be used to accomplish the removal. As such, groups of displacer rods are attached to a "spider", with that spider being moved axially in the reactor with a suitable drive means (usually a motor-gear means). In order that this removal can be effectively achieved, each displacer rod must be provided with guides to prevent non-axial movement. For a given reactor, many groups of displacer rods are used, and it may be desirable that removal of one group is at different times relative to another group. This removal must be accomplished without deleteriously affecting temperature and neutron flux gradients within the reactor. Thus, very complex mechanical means and controls are required to accomplish regulation of appropriate moderation of the nuclear reaction with the displacer rods of the prior art.

In the '621 patent, these displacer rods contain burnable neutron poison material. Provision is made, via rupture elements, to permit gradual dissolution of the burnable poison material, with this material entering into the coolant and thus the moderator. This poison provides control of the excess reactivity. As the poison burns, together with the burn-up of the fuel, the reactor continues to be controlled.

Of course, in any of the reactor designs, there are normal control rods that regulate the level of operation of the nuclear reactor.

Accordingly, it is an object of the present invention to provide an apparatus for increasing the fuel efficiency of a nuclear reactor without adding elaborate mechanical and electrical controls.

It is another object of the present invention to provide this increased fuel efficiency using substantially conventional reactor construction without the complexity of movement of displacer rods as called for in the prior art reactor designs.

A further object of the present invention is to provide displacer rods for a nuclear reactor to initially provide proper moderation for any excess reactivity of a pressurized water reactor, with these displacer rods having a selected dissolution or volatilization/sublimation rate, whereby the volume of the displacer rods is gradually decreased as the nuclear fuel is burned so as to control (increase) the volume of the moderator during reactor operation.

Still another object of the present invention is to provide a spectral shift nuclear reactor in which displacer rods formed of a sacrificial material provide for a change in the fuel-to-moderator ratio without mechanical movement and take into account temperature and neutron flux gradients within the reactor.

Another object of the present invention is to provide controlled dissolution of displacer rods in a pressurized water reactor, with the product of that dissolution having no effect upon the nuclear characteristics of the reactor.

These and other objects of the present invention will become apparent upon a consideration of the drawings that follow together with a detailed description of the invention.

DISCLOSURE OF THE INVENTION

In accordance with the present invention, a nuclear reactor is provided that contains displacer rods throughout the reactor so as to provide for the control of excess reactivity as the reactor is operated. These displacer rods, which appropriately displace a controlled portion of fluid moderator within the reactor, are fabricated at least partially from a sacrificial material that slowly dissolves, volatilizes or sublimes during operation such that the effective quantity of the fluid moderator increases during the life of the reactor as the fuel material is burned. The displacer rods are fabricated from a material that does not poison the reactor or have any other nuclear effect upon the nuclear reaction. The choice of a material for the displacer rods depends upon the rate of decrease of the displacer rod volume in the specific fluid moderator material.

BEST MODE FOR CARRYING OUT THE INVENTION

Figure 1:
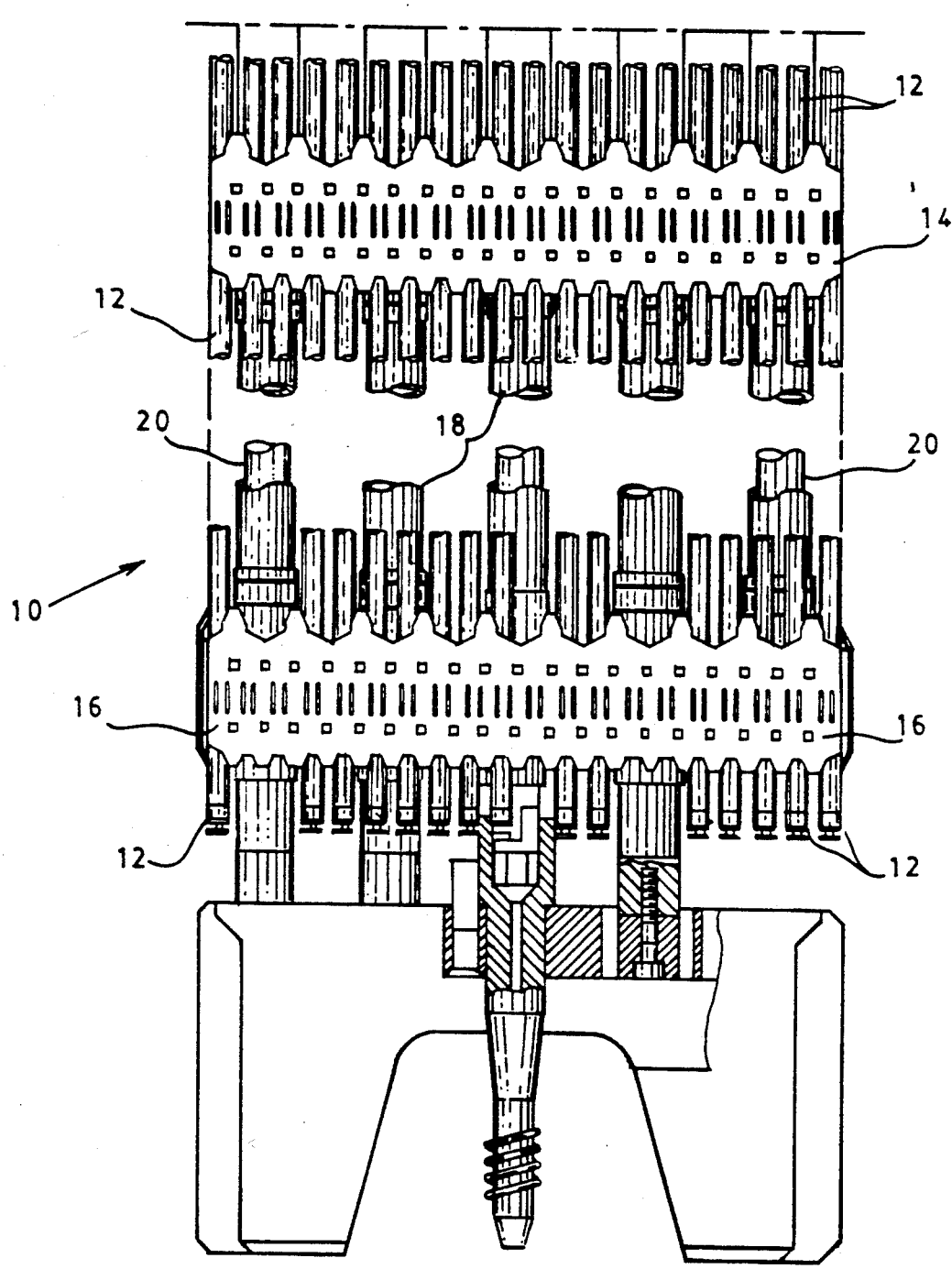
FIG. 1 is a drawing illustrating a partial vertical cross section of a typical fuel element of a pressurized water nuclear reactor showing the position of displacer rods located as interspersed within fuel elements of the reactor.
Figure 2:
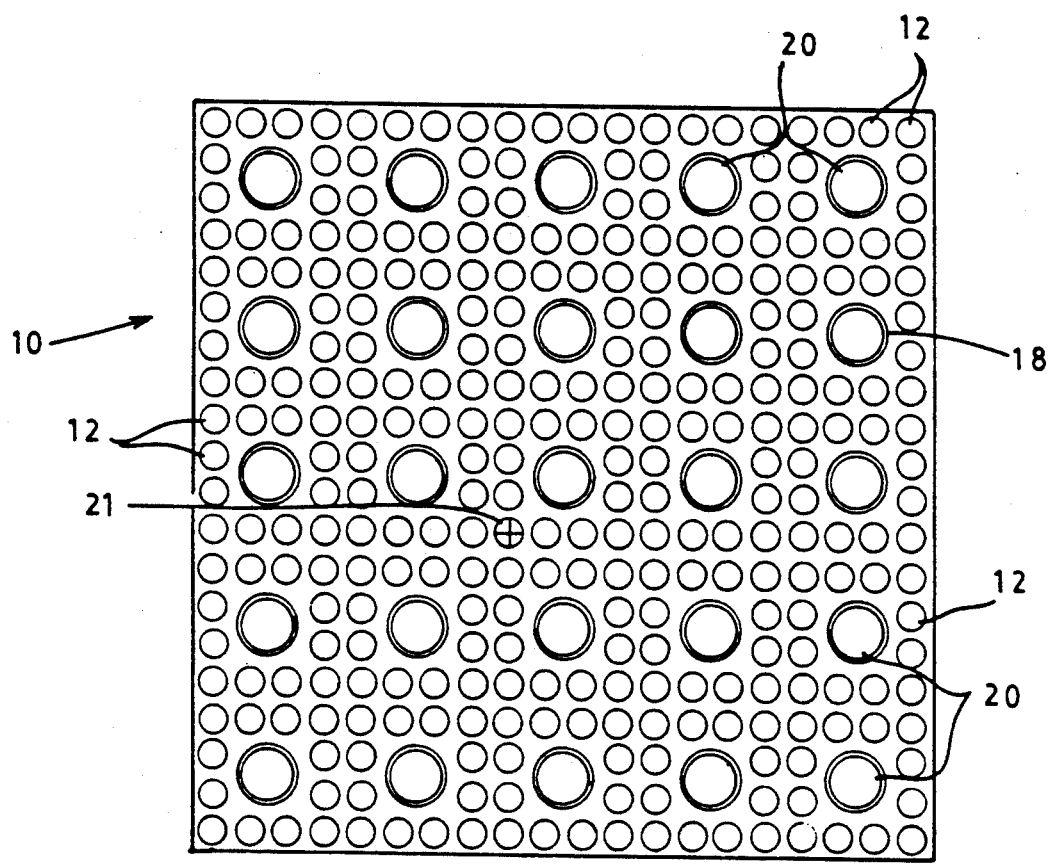
FIG. 2 is a drawing illustrating a partial transverse cross section of the fuel element of FIG. 1 further showing the position of the displacer rods.

The present invention will be best understood by reference to FIGS. 1 and 2 which are, respectively, vertical and horizontal cross sections of portions of a pressurized water reactor utilizing displacer rods of the present invention. The overall construction of such nuclear reactors will be known to those skilled in the art. Also, the general construction of these reactors is given in numerous of the above-cited patents, for example U.S. Pat. No. 4,716,006 that is incorporated herein by reference to teach the overall construction of pressurized water reactors.

FIG. 1 is a cut-away drawing of a single fuel element 10 of such a reactor. It contains, for example, a plurality of elongated metal-clad fuel rods 12 held in suitable upper and lower grids 14, 16. The fuel element 10 also has appropriately spaced guide tubes 18 to be used for regular axially movable control rods (not shown). A portion of these guide tubes 18 is used to support displacer rods 20 to be discussed in connection with FIGS. 3A, 3B, 4 and 5. It will be understood that a given nuclear reactor will have a plurality of these fuel elements 10, and that the number of fuel rods 12, their spacing and their fuel loading may vary depending upon the position of that fuel element in a specific nuclear reactor. Water is caused to flow through the interstices between the fuel rods 12 and the displacer rods 20, with this water (in this type of reactor) providing both the moderation of the neutrons and the cooling of the fuel elements.

A transverse cross section of a portion of a typical nuclear fuel element of FIG. 1 showing the positional relationship of the fuel rods 12 and the displacer rods 20 is shown in FIG. 2. Also indicated is a typical instrument thimble 21 for this fuel element. It can be seen from these figures that the displacer rods 20 exclude the water from a portion of the fuel element 10. As discussed above, this is required to overcome the excess reactivity of the nuclear reactor. In most of the prior art, these displacer rods are completely withdrawn at selected positions and times so as to increase the quantity of the moderator within the fuel elements. According to the present invention, however, the displacer rods 20 are not moved.

Figure 3A:
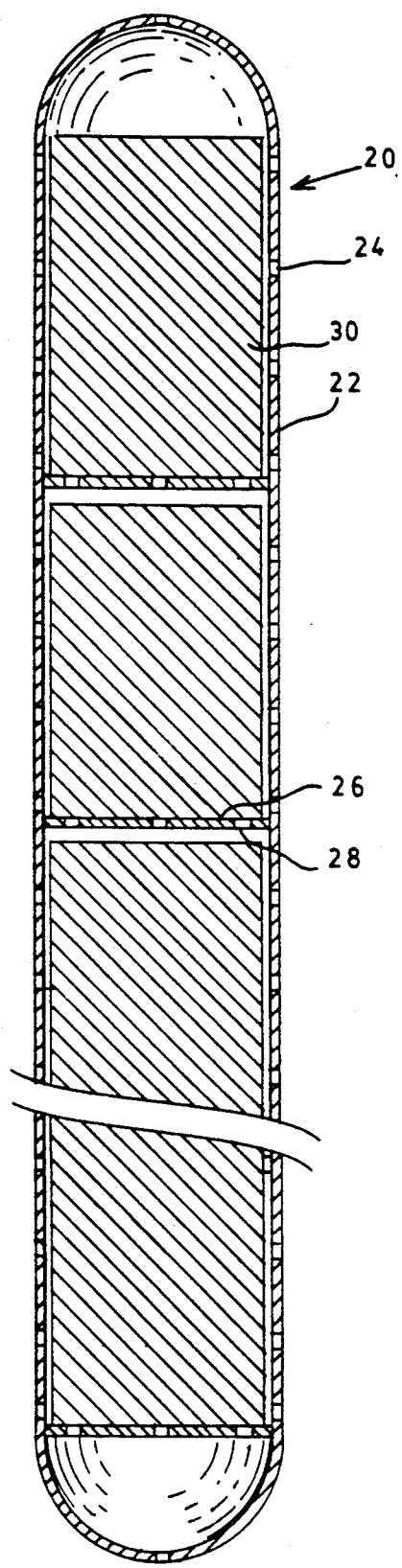
FIG. 3A is a drawing illustrating a portion of one embodiment of a displacer rod designed to accomplish the objects of the present invention, with the sacrificial material illustrated at the beginning of operation of the nuclear reactor in which it is utilized.
Figure 3B:
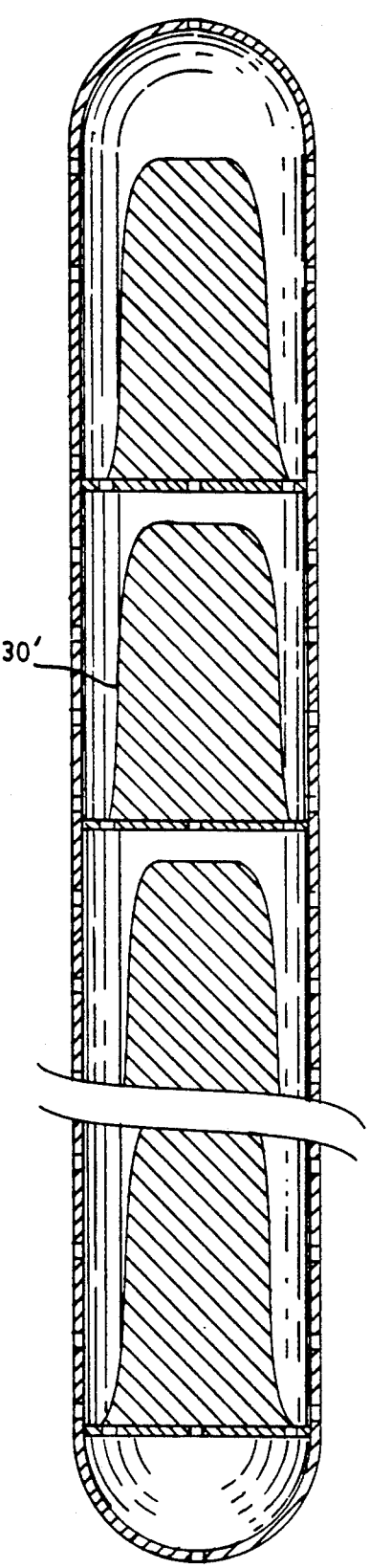
FIG. 3B illustrates the displacer rod of FIG. 3A after a period of operation within the nuclear reactor.
Figure 4:
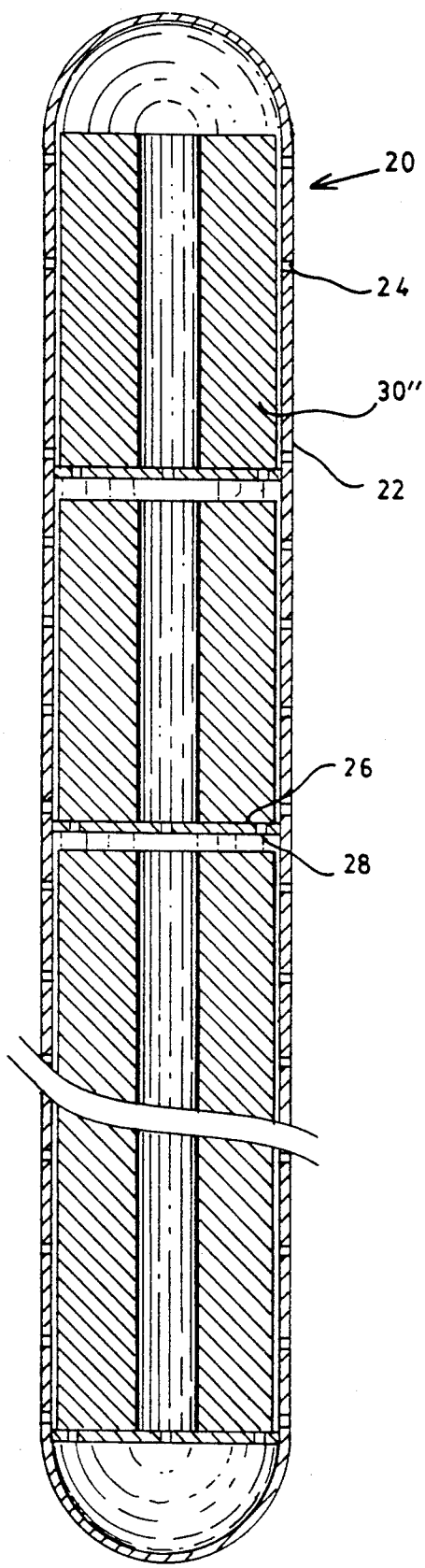
FIG. 4 is a drawing illustrating a portion of another embodiment of a displacer rod designed to accomplish the objects of the present invention.
Figure 5:
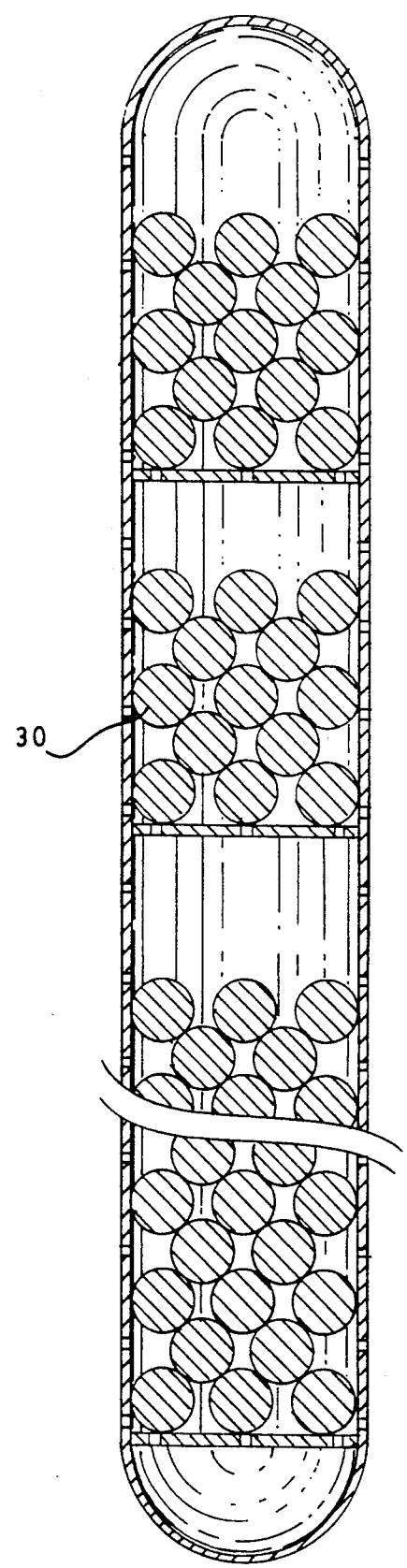
FIG. 5 is a drawing illustrating a portion of still another embodiment of a displacer rod according to the present invention.

Referring now to FIGS. 3A and 3B, one embodiment of a displacer rod 20 is illustrated that does not require any movement in order to regulate the excess reactivity of the reactor. The various components thereof are illustrated as enlarged in order to better understand the construction. In this particular embodiment, there is a support sleeve 22 which is perforated as at 24 such that the fluid moderator of the reactor can penetrate into the interior of the sleeve. Within the sleeve 22 there can be axially-spaced support plates 26 which, in turn, can also be provided with perforations as at 28. Supported by these plates 26 are elements 30 of a material that has a selected sacrificial (dissolution, volatilization, sublimation, etc.) rate in the fluid moderator such that the volume of the elements 30 decreases at a rate to increase the proportion of the fluid moderator within the reactor at a rate sufficient to compensate for the changing excess reactivity of the reactor. In a reactor having water as the moderator, the elements 30 can be fabricated from one of the slowly-dissolving aluminum alloys, for example. As will be understood from a table referenced hereinafter, several materials are available with slow dissolution rates that can be used for this purpose. Further, there will be materials known to those versed in corrosion art that will have satisfactory "dissolution" rates. Since there are vertical temperature and neutron flux gradients in this type of reactor, and since the change in excess reactivity is non-linear, different alloys can be used along the length of a given displacer rod 20 to achieve the desired dissolution rate at the specific temperature and flux of those locations and thereby provide the desired rate of change of the volume of the displacer rods to correct for temperature and radiation effects.

Other methods for control of the rate of displacer rod volume change relate to the construction of the displacer rod (such as changes in the components thereof described with respect to FIGS. 3A and 3B, below). This control of dissolution, volatilization, sublimation, etc. can be effected by controlling the surface-to-volume ratio of any sacrificial component of the displacer rods. For example, various shape configurations are envisioned, such as providing passageways through a generally cylindrical body 30" (see FIG. 4). Other methods of effecting a change in the surface-to-volume ratio will be known to persons skilled in the art.

In FIG. 3A, the elements 30 of sacrificial material are depicted as pellets for convenience of illustration. Typically, these pellets would have a diameter of about 0.8 in. In other embodiments they can be configured as spherical or multiple spheres 30''' that provide further control of the change in the relative surface areas and the compositions of the units (see FIG. 5). Thus, the present invention is not to be limited by the physical configuration of the "sacrificial" material within the displacer rods 20 or by the physical arrangement or presence of the containment sleeves 22.

FIG. 3B illustrates the general structure of the displacement rods (depicted in FIG. 3A) after substantial operation of a nuclear reactor into which these rods have been inserted. This shows that a portion of each of the elements 30' of sacrificial material has been removed; however, there is substantial structural integrity to the elements so that fragments are not incorporated into the flowing coolant/moderator.

Not all reactors will require that the sacrificial material be contained in a sleeve. It may be in the form of rods or a series of unclad pellets with, for example, some form of stiffener to prevent entrapment of material in the flowing coolant. The particular choice of structure will depend upon the particular reactor environment. The desired compositional change along the length of the rods can be achieved by conventional powder-metallurgy techniques, for example.

Although the structure illustrated in FIG. 3A is initially designed for use in a pressurized water reactor where the moderator is the flowing water coolant and the sacrificial material dissolves in the water, the same principal can be applied to nuclear reactors where it is desired to gradually change (increase) the ratio of a fluid (liquid or gas) moderator with respect to the quantity of unburned nuclear fuel. This fuel moderator can be either a liquid or a gas. Typical of such moderators are liquid sodium or helium. However, the concept of using a sacrificial material is not limited to these named moderators, but is applicable to all fluid moderators. In these instances, the material of the sacrificial material is chosen to provide a desired rate of dissolution, volatilization or sublimation in the fluid of choice.

It is preferred that the reaction at the displacer rod result in no fine materials. For example, in a liquid-cooled reactor it is desired that the sacrificial material result in an ionic form within the fluid. Since some filtering of the fluid moderator can be accomplished in normal operation of the reactor and since most reactors provide for a daily filtration, an ion exchange bed can be added to remove the results of the dissolution. In the case of gas-cooled reactors, it is desired that the sacrificial material be volatilized or sublimed. In this case, appropriate gaseous separation techniques would be applied.

For water cooled and moderated nuclear reactors an average corrosion rate of about 1.3 mg/cm$^2$-day will be required, although a range of about 0.5 to about 2.5 mg/cm$^2$-day is envisioned for the various types of nuclear reactors and for the non-linear change in the excess reactivity. This assumes a normal operating life of the reactor at 18 to 24 months. The actual rate will depend upon the temperature and pressure of the system. For a PWR operating at 580 degrees F and a pressure of 2250 psi, the average corrosion rate to achieve the necessary change in volume will be about 1 mg/cm$^2$-day.

Listed in the single Table are several aluminum alloys with the published corrosion (dissolution) rate in water. It can be seen that there are numerous of these alloys that will provide the rates for the reactors currently of interest. Thus, knowing the operating temperature and pressure, the excess reactivity that is to be controlled, and the corrosion rates in the fluid of the reactor, an improved displacer rod can be constructed that will automatically adjust in volume as the nuclear fuel is burned. Of course, persons knowledgeable in corrosion, volatilization and sublimation are aware of other materials that exhibit rates in this range. In this manner, the fuel efficiency of the reactor will be increased in a much less costly manner than taught by the prior art.

Although certain constructions and materials are discussed herein for illustration, these are not given as a limitation of the present invention. Rather, the invention is to be limited only by the appended claims or their equivalents when read together with a detailed discussion of the invention.

TABLE

CORROSION RATES OF ALUMINUM ALLOYS IN AQUEOUS SOLUTIONS

| ALLOY | TREATMENT | | | RATE mg/cm$^2$-day | REF. |
|---|---|---|---|---|---|
| | TEMP. | TEST SOL. pH | Other | | |
| 1100 H14 | | | | 0.255 | 1 |
| 3004 H34 | | | | 0.306 | 1 |
| 4043 H14 | | | | 0.248 | 1 |
| 5005 H34 | | | | 0.276 | 1 |
| 5050 H34 | | | | 0.258 | 1 |
| 5052 H34 | | | | 0.268 | 1 |
| 5154 H34 | | | | 0.241 | 1 |
| 5454 O | | | | 0.257 | 1 |
| 5454 H34 | | | | 0.253 | 1 |
| 5456 O | | | | 0.282 | 1 |
| 5083 O | | | | 0.347 | 1 |
| 5083 H34 | | | | 0.277 | 1 |
| 5086 H34 | | | | 0.322 | 1 |
| 2014 T6 | | | | 0.477 | 1 |
| 2024 T3 | | | | 0.756 | 1 |
| 2024 T86 | | | | 0.596 | 1 |
| 2024 TB1 | | | | 0.536 | 1 |
| 6061 T4 | | | | 0.028 | 1 |
| 6061 T6 | | | | 0.312 | 1 |
| 7075 T6 | | | | 0.509 | 1 |
| 7079 T6 | | | | 0.469 | 1 |
| 1199 | | | | 1.15 | 2 |
| 5154 H38 | | | | 1.04 | 2 |
| 5454 H34 | | | | 1.11 | 2 |
| 5457 H34 | | | | 1.05 | 2 |
| 5456 O | | | | 2.18 | 2 |
| 5456 H321 | | | | 0.12 | 2 |
| 5083 O | | | | 1.11 | 2 |
| 5086 O | | | | 1.07 | 2 |
| M388 | 500 | 5 | | 22.4 | 3 |
| M388 | 500 | 6.7 | | 28 | 3 |
| M388 | 422 | | 300PSIG | 9.35 | 3 |
| X8001 | 500 | 5.5 | | 92.3 | 4 |
| X8001 | 600 | 5.5 | | 240 | 4 |
| X2219 | 550 | 9 | | 100 | 4 |

TABLE-continued

CORROSION RATES OF ALUMINUM ALLOYS IN AQUEOUS SOLUTIONS

| ALLOY | TREATMENT | | | RATE mg/cm²-day | REF. |
|---|---|---|---|---|---|
| | TEMP. | TEST SOL. pH | Other | | |
| 198X | 600 | 5.5 | | 33 | 4 |

REFERENCES
1. ASM, "METALS HANDBOOK". Ninth Ed. Vol 13. pp 599. Weathering data for 1.27 mm thick Al alloys after 7 years exposure
2. ASM, "METALS HANDBOOK". Ninth Ed. Vol 13. pp 605. Summary of data from 10 years seawater exposures
3. C. R. BREDEN, N. R. GRANT. "SUMMARY OF CORROSION INVESTIGATIONS ON HIGH TEMPERATURE ALUMINUM ALLOYS". Argonne National Laboratory. February 1960. Flow of water (7 fps)
4. N. R. GRANT. "SUMMARY OF CORROSION INVESTIGATIONS OF HIGH-TEMPERATURE ALUMINUM ALLOYS". Argonne National Laboratory. September 1961. Flow of water (7 fps)
5. ASM ENGINEERING BOOKSHELF. "SOURCE BOOK ON SELECTION AND FABRICATION OF ALUMINUM ALLOYS". American Society for Metals, 1978. pp. 9-11.

We claim:

1. A displacer rod for use in a nuclear reactor to effect a spectral shift in said reactor to achieve increased nuclear fuel efficiency, said nuclear reactor containing a fluid moderator juxtaposed with fuel elements containing said nuclear fuel, said displacer rod comprising a body containing a non-poison sacrificial material immersed in said moderator, said sacrificial material having a reduction in volume rate when subjected to said moderator whereby said body decreases in effective volume during operation of said nuclear reactor to thereby increase the effective volume of said moderator to compensate for excess reactivity of said fuel in said fuel elements during operation of said nuclear reactor.

2. The displacer rod of claim 1 wherein said body comprises:
a sleeve member for being disposed within said moderator;
elements of said non-poison sacrificial material positioned within said sleeve member; and
means for introducing said moderator into said sleeve whereby said sacrificial material is reduced in volume by said moderator to achieve said effective decrease in volume of said displacer rod during operation of said nuclear reactor.

3. The displacer rod of claim 2 wherein said sleeve member is provided with wall perforations as said means for introducing said moderator into said sleeve member.

4. The displacer rod of claim 3 wherein said sleeve member is provided with internal transverse support plates, said support plates provided with further perforations, said support plates supporting portions of said non-poison sacrificial material.

5. The improved displacer rod of claim 2 wherein said non-poison sacrificial material has a reduction in volume rate of about 0.5 to about 2.5 mg/cm²-day.

6. The displacer rod of claim 2 wherein said moderator is water and wherein said non-poison sacrificial material is an alloy of aluminum having a dissolution rate in water of about 0.5 to about 2.5 mg/cm²-day.

7. The displacer rod of claim 4 wherein said non-poison sacrificial material is in the form of elongated pellets supported on said support plates.

8. The displacer rod of claim 4 wherein said non-poison sacrificial material is in the form of spheres supported on said support plates.

9. The displacer rod of claim 1 wherein said sacrificial material varies in composition along a length of said displacer rod to achieve said dissolution rate according to a temperature gradient along said displacer rod in said nuclear reactor.

10. The displacer rod of claim 1 wherein said sacrificial material is provided with a surface-to-volume ratio configuration whereby said sacrificial material changes in volume as a function of time to match a change of excess reactivity of said nuclear reactor as a function of time.

11. A displacer rod for use in a pressurized water nuclear reactor to effect a spectral shift in said reactor to achieve increased nuclear fuel efficiency, said nuclear reactor containing a water moderator-coolant juxtaposed with fuel elements containing said nuclear fuel, said displacer rod comprising a body containing a non-poison sacrificial material immersed in said moderator-coolant, said sacrificial material having a dissolution rate when subjected to said moderator-coolant whereby said body decreases in effective volume during operation of said nuclear reactor to thereby increase the effective volume of said moderator-coolant to compensate for excess reactivity of said fuel in said fuel elements during operation of said nuclear reactor.

12. The displacer rod of claim 11 wherein said non-poison sacrificial material has a dissolution rate in water of about 0.5 to about 2.5 mg/cm²-day.

13. The displacer rod of claim 12 wherein said non-poison sacrificial material is an alloy of aluminum.

14. The displacer rod of claim 11 wherein said body comprises:
a sleeve member for being disposed within said moderator-coolant;
elements of said non-poison sacrificial material positioned within said sleeve member; and
means for introducing said moderator-coolant into said sleeve whereby said sacrificial material is dissolved by said moderator-coolant to achieve said effective decrease in volume of said displacer rod during operation of said nuclear reactor.

15. The displacer rod of claim 14 wherein said sleeve member is provided with wall perforations as said means for introducing said moderator-coolant into said sleeve member.

16. The displacer rod of claim 15 wherein said sleeve member is provided with internal transverse support plates, said support plates provided with further perforations, said support plates supporting portions of said non-poison sacrificial material.

17. The displacer rod of claim 16 wherein said non-poison sacrificial material is in the form of elongated pellets supported on said support plates.

18. The displacer rod of claim 16 wherein said non-poison sacrificial material is in the form of spheres supported on said support plates.

19. The displacer rod of claim 11 wherein said non-poison sacrificial material varies in composition along a length of said displacer rod to achieve said dissolution rate according to a temperature gradient along said displacer rod in said nuclear reactor.

20. The displacer rod of claim 11 wherein said non-poison sacrificial material is provided with a surface-to-volume ratio configuration whereby said sacrificial material changes in volume as a function of time to match a change of excess reactivity of said nuclear reactor as a function of time.

* * * * *